US012521996B2

(12) United States Patent
Woo et al.

(10) Patent No.: US 12,521,996 B2
(45) Date of Patent: Jan. 13, 2026

(54) INKJET HEAD UNIT AND INKJET PRINTING EQUIPMENT INCLUDING THE SAME

(71) Applicant: SEMES CO., LTD., Cheonan-si (KR)

(72) Inventors: Jang Mi Woo, Cheonan-si (KR); Jin Hyuck Yang, Daegu (KR); Ki Hoon Choi, Hwaseong-si (KR); Young Hoon Jeong, Cheonan-si (KR)

(73) Assignee: SEMES CO., LTD., Cheonan-si (KR)

( * ) Notice: Subject to any disclaimer, the term of this patent is extended or adjusted under 35 U.S.C. 154(b) by 218 days.

(21) Appl. No.: 18/220,766

(22) Filed: Jul. 11, 2023

(65) Prior Publication Data

US 2024/0066887 A1 Feb. 29, 2024

(30) Foreign Application Priority Data

Aug. 23, 2022 (KR) ........................ 10-2022-0105744

(51) Int. Cl.
*B41J 2/21* (2006.01)
*B41J 2/045* (2006.01)
*B41J 2/14* (2006.01)

(52) U.S. Cl.
CPC ............. *B41J 2/21* (2013.01); *B41J 2/04505* (2013.01); *B41J 2/14* (2013.01); *B41J 2002/14362* (2013.01)

(58) Field of Classification Search
CPC .... B41J 2202/19; B41J 2/145; B41J 2202/20; B41J 2002/14362; B41J 2/14024; B41J 2/14; B41J 2/21; B41J 2/04505; B41J 2/2132; B41J 2/155; B41J 3/407; B41J 2/01; B41J 3/543; B41J 3/54; B41J 2/11; B41J 11/001; B41J 2/175; B41J 2029/3935; H10K 71/135
See application file for complete search history.

(56) References Cited

U.S. PATENT DOCUMENTS

| | | | |
|---|---|---|---|
| 2002/0067389 | A1 | 6/2002 | Braun |
| 2003/0186613 | A1 | 10/2003 | Kawase |

FOREIGN PATENT DOCUMENTS

| | | | | |
|---|---|---|---|---|
| JP | 2009-169415 | | 7/2009 | |
| JP | 2009169415 A | * | 7/2009 | ................ B41J 3/28 |
| KR | 10-2002-0030783 | | 4/2002 | |
| KR | 10-2003-0074253 | | 9/2003 | |
| KR | 10-2014-0021020 | | 2/2013 | |
| KR | 10-2022-0022493 | | 2/2022 | |

OTHER PUBLICATIONS

Office Action from the Korean Intellectual Property Office dated Feb. 15, 2024.

* cited by examiner

*Primary Examiner* — Jannelle M Lebron

(57) ABSTRACT

Proposed are an inkjet head unit capable of forming high-resolution pixels on a substrate and inkjet printing equipment including the same. An inkjet head unit of inkjet printing equipment according to one embodiment includes a head pack including a plurality of ejection heads configured to eject ink of the same color to a substrate; and a head base on which a plurality of head packs are installed to be repeatedly coaxially arranged in color order.

10 Claims, 10 Drawing Sheets

INKJET HEAD UNIT AND INKJET PRINTING EQUIPMENT INCLUDING THE SAME

CROSS-REFERENCE TO RELATED APPLICATION

The present application claims priority to Korean Patent Application No. 10-2022-0105744, filed Aug. 23, 2022, the entire contents of which is incorporated by reference herein for all purposes.

BACKGROUND

Field of the Invention

The present disclosure relates to an inkjet head unit capable of forming high-resolution pixels on a substrate and inkjet printing equipment including the same.

Description of the Related Art

The manufacture of displays involves a plurality of processing steps for forming a device for light emission on a substrate (transparent glass). The processing steps may include, for example, coating, exposure, deposition, cleaning, etching, and the like. Each processing step may be sequentially performed by manufacturing equipment disposed in a display manufacturing plant. In addition, as another processing step, there has been introduced an inkjet printing technique that forms a film or pattern by ejecting droplets (ink) onto a substrate.

An inkjet printing process works by ejecting ink onto a substrate. Conventionally, in order to eject the ink onto the substrate, inkjet printing equipment is disposed in a display manufacturing plant, and the inkjet printing process for the substrate is performed by the inkjet printing equipment. Meanwhile, along with increasing user demand for large-sized devices, the production of large-sized substrates is increasing. Thus, a need exists for a method capable of efficiently performing inkjet printing on a substrate.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure provides an inkjet head unit capable of forming high-resolution pixels on a substrate and inkjet printing equipment including the same.

In order to achieve the above objective, according to one aspect of the present disclosure, there is provided an inkjet head unit of inkjet printing equipment, the inkjet head unit including: a head pack including a plurality of ejection heads configured to eject ink of the same color to a substrate; and a head base on which a plurality of head packs are installed to be repeatedly coaxially arranged in color order.

According an embodiment of the present disclosure, the head packs may include: a first head pack including a plurality of ejection heads configured to eject ink corresponding to a first color; a second head pack including a plurality of ejection heads configured to eject ink corresponding to a second color; and a third head pack including a plurality of ejection heads configured to eject ink corresponding to a third color.

According an embodiment of the present disclosure, a head pack set in which the first head pack, the second head pack, and the third head pack are sequentially arranged may be repeatedly installed on the head base.

According an embodiment of the present disclosure, the substrate may be configured to be moved along a first axial direction, and the head packs may be arranged along a second axial direction orthogonal to the first axial direction.

According an embodiment of the present disclosure, the head base may be configured to be moved along the second axial direction.

According an embodiment of the present disclosure, the head packs may be arranged on the head base to have a length equal to a length of the substrate in the second axial direction.

According an embodiment of the present disclosure, each of the ejection heads of each of the head packs may include a plurality of nozzles arranged to overlap each other along the first axial direction, and each of the head packs and another head pack may be arranged so as to not overlap each other along the first axial direction.

According to another aspect of the present disclosure, there is provided inkjet printing equipment including: a stage configured to support a substrate; an inkjet head unit configured to eject ink onto the substrate; and a gantry provided as a structure on which the inkjet head unit is installed. The inkjet head unit may include: a head pack including a plurality of ejection heads configured to eject ink of the same color to a substrate; a head base on which a plurality of head packs are installed to be repeatedly coaxially arranged in color order; and a head frame on which the head packs are installed, and coupled to the gantry.

According to another aspect of the present disclosure, there is provided inkjet printing equipment including: a stage configured to support a substrate configured to be moved along a first axial direction; an inkjet head unit configured to eject ink onto the substrate; a gantry provided as a structure on which the inkjet head unit is installed; and an ink inspection camera configured to inspect a state of the ink ejected on the substrate. The inkjet head unit may include: a head pack including a plurality of ejection heads configured to eject ink of the same color to a substrate; a head base on which a plurality of head packs are installed to be repeatedly arranged in color order along a second axial direction orthogonal to the first axis direction; and a head frame on which the head packs are installed, and coupled to the gantry.

According to an embodiment of the present disclosure, the inkjet head unit may further include: an ink reservoir configured to store the ink supplied to the head pack; and a pressure controller configured to control an ejection pressure of the ink.

According to an embodiment of the present disclosure, the inkjet head unit may further include: an ink reservoir configured to store the ink supplied to the head pack; and a pressure controller configured to control an ejection pressure of the ink. The inkjet head unit may further include a circulation pipe configured to circulate remaining ink used in the ejection heads to the ink reservoir. A filter or a degassing device for maintaining a state of ink may be provided in the circulation pipe.

According to an embodiment of the present disclosure, the inkjet printing equipment may further include a flatness inspection camera installed on the head frame and configured to inspect an alignment state of the ejection heads.

According to the present disclosure, the plurality of head packs each having the plurality of ejection heads ejecting ink of the same color onto the substrate are repeatedly coaxially arranged in color order. Thus, it is possible to immediately identify a head pack and a nozzle that have ejected ink on the substrate, thereby enabling quick nozzle inspection and maintenance.

Due to such a reduction in time for nozzle inspection and maintenance, it is possible to increase utilization of the nozzles and increase yield and lifespan. Furthermore, inkjet printing is performed on the entire area of the substrate and the substrate does not need to be divided into a plurality of printing areas. Thus, it is possible to reduce an axial movement amount. Also, it is possible to reduce the overall weight of the equipment.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
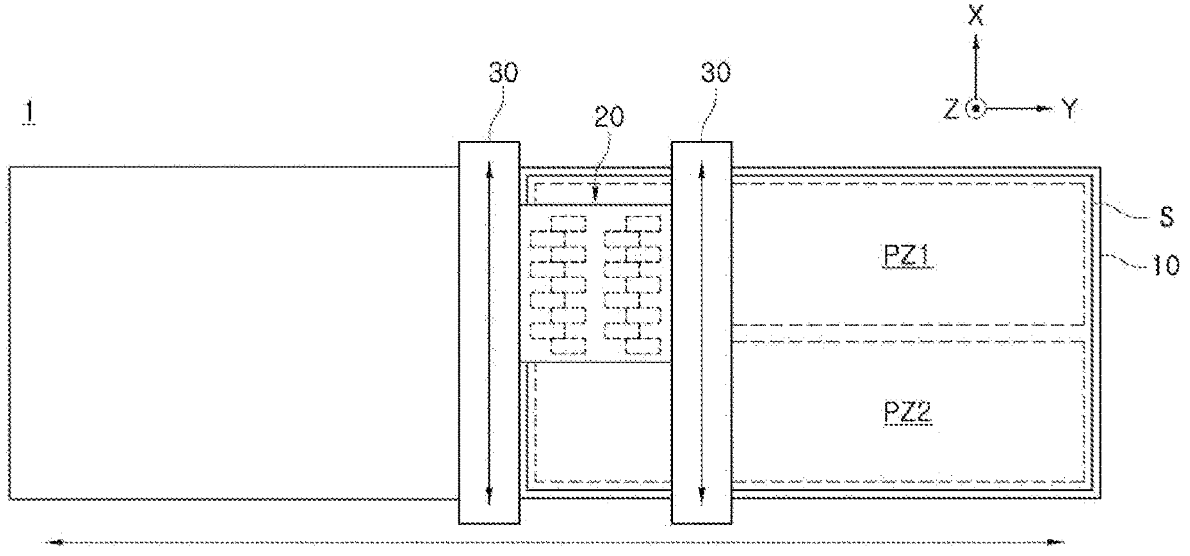
FIGS. 1 to 4 are views illustrating the configuration of inkjet printing equipment according to the related art.

Hereinbelow, exemplary embodiments of the present disclosure will be described in detail with reference to the accompanying drawings such that the present disclosure can be easily embodied by one of ordinary skill in the art to which the present disclosure belongs. The present disclosure may be embodied in many different forms and is not limited to the embodiments set forth herein.

For clarity, a description of parts not related to describing the present disclosure is omitted here, and the same reference numerals are allocated to the same or similar components throughout the disclosure.

Components having the same structure in various embodiments will be allocated the same reference numeral and explained only in a representative embodiment, and components which are different from those of the representative example will be described in the other embodiments.

As used herein, when an element is referred to as being “connected to” (or coupled to) another element, the element can be directly connected (coupled) to the other element or be indirectly connected (coupled) to the other element having an intervening element therebetween. It will be understood that the terms “comprise”, “include”, and/or “have” when used herein, specify the presence of stated elements but do not preclude the presence or addition of one or more other elements.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

FIGS. 1 to 4 are views illustrating the configuration of inkjet printing equipment 1 according to the related art.

A schematic structure of the inkjet printing equipment 1 according to the related art is illustrated in FIG. 1. The inkjet printing equipment 1 largely includes: a stage 10 for providing a space in which a substrate S is placed; an inkjet head unit 20 for ejecting ink onto the substrate S; and a gantry 30 on which the inkjet head unit 20 is installed. The substrate S is configured to be moved along a first axial direction (Y direction) on the stage 10, and the inkjet head unit 20 is configured to be moved on the gantry 30 along a second axial direction (X direction) orthogonal to the first axial direction (Y direction). The layout of the inkjet printing equipment 1 according to the related art is configured for the purpose of ensuring that nozzles are all matched with pixel areas of the substrate S.

Figure 2:
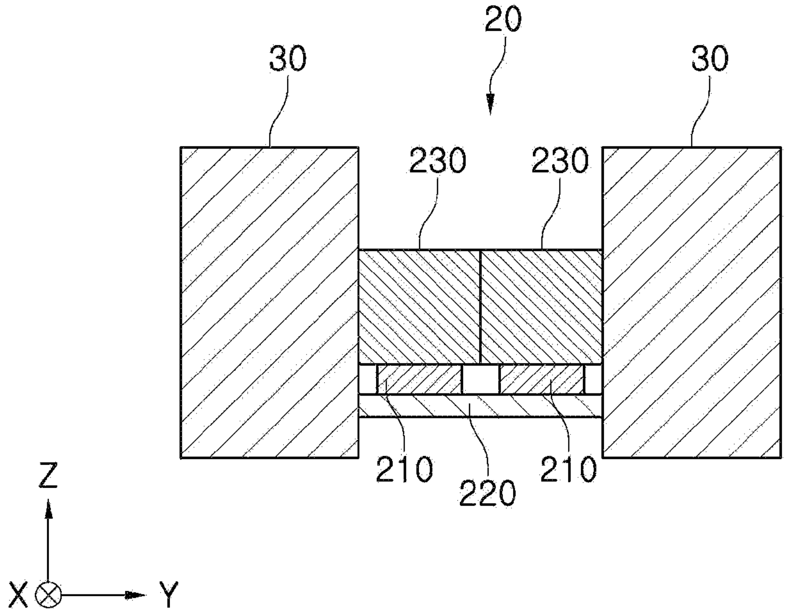

Referring to FIGS. 1 and 2, the gantry 30 is composed of two gantries 30 extending along the second axial direction (X direction). The inkjet head unit 20 is moved by being coupled to the two gantries 30. The inkjet head unit 20 largely includes: a head pack 210 composed of an ejection head 212 for ejecting ink; a head base 220 on which a plurality of head packs 210 are installed; and a head frame 230 on which a head base 220 is installed and configured to be moved along the gantries 30.

Figure 4:
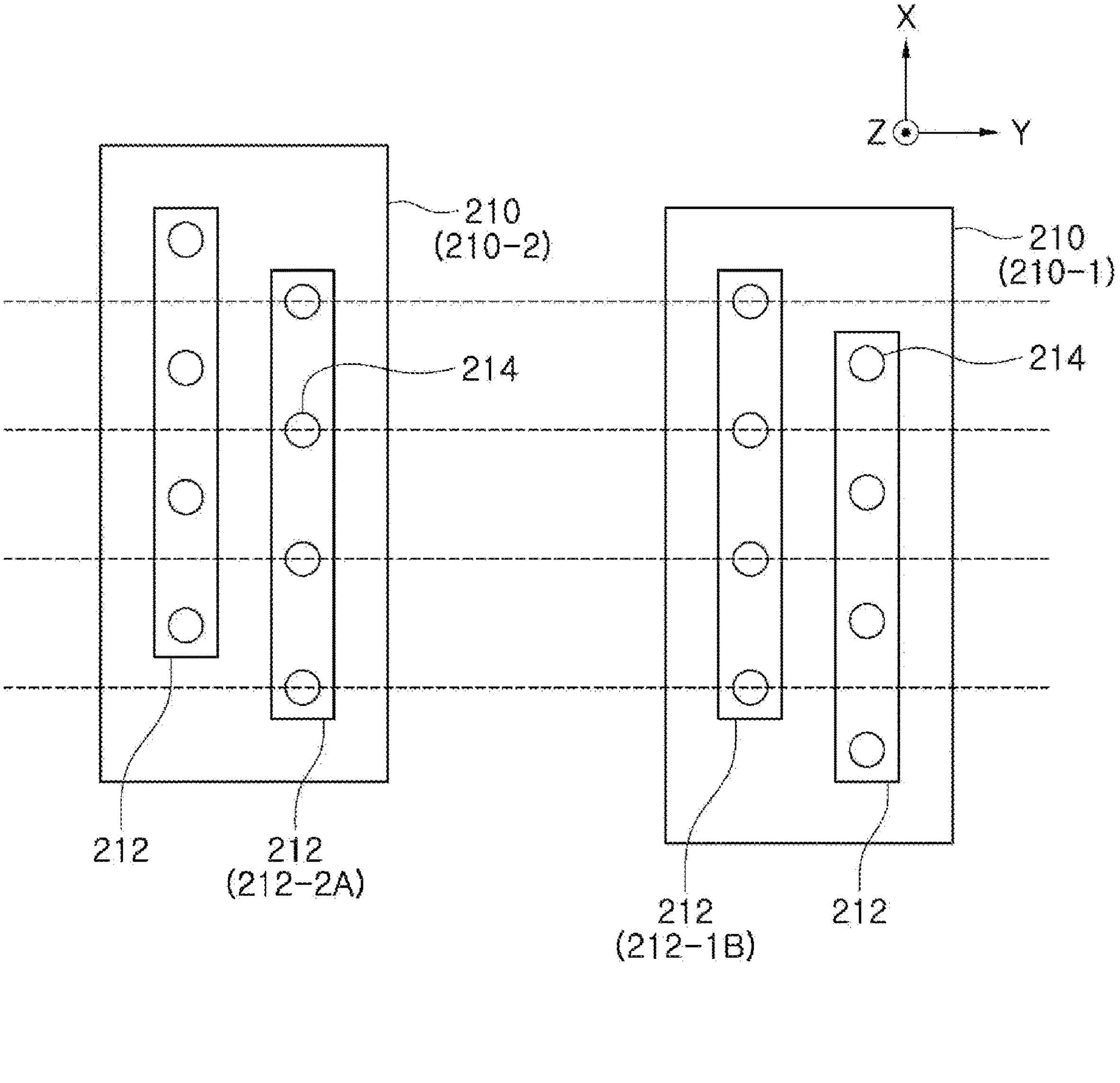

As illustrated in FIG. 4, each of the head packs 210 includes a plurality of ejection heads 212. Each of the ejection heads 212 includes a plurality of nozzles 214. The head frame 230 is coupled to the gantries 30 on opposite sides thereof. The head base 220 is integrally provided below the head frame 230. The plurality of head packs 210 are arranged on the head base 220 along the second axial direction (X direction).

According to the related art, the substrate S is moved along the first axial direction (Y direction), and repeats forward and backward movements. During the forward or backward movement of the substrate S, the inkjet head unit 20 ejects the ink onto the substrate S while being moved along the second axial direction (X direction). Here, when the inkjet head unit 20 is not able to eject the ink to the entire area of the substrate S, an ink ejection process is performed for each of two divided areas PZ1 and PZ2 on the substrate S, so that the overall ink ejection process is performed two times.

Figure 3:
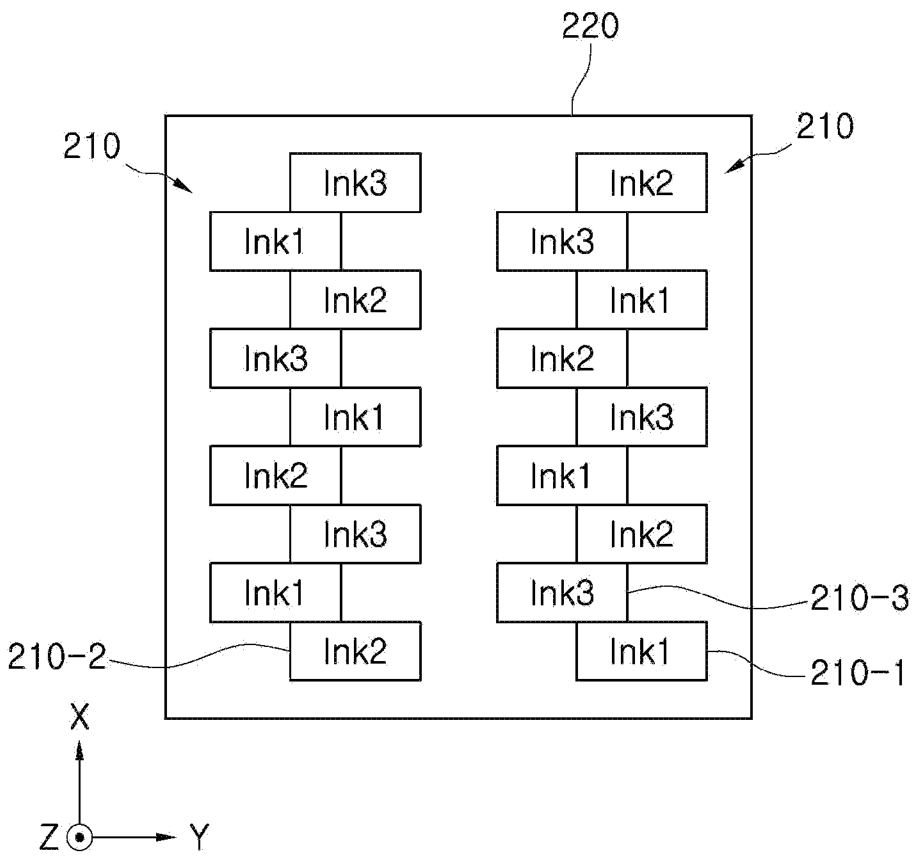

FIG. 3 illustrates the arrangement structure of the head packs 210 according to the related art. The head packs 210 are arranged in two rows. In each row, three head packs 210 corresponding to three colors are sequentially and repeatedly arranged. Referring to FIG. 3, a first head pack 210-1, a second head pack 210-2, a third head pack 210-3 are repeatedly arranged. The first head pack 210-1 ejects ink corresponding to pixels of a first color (e.g., red R), the second head pack 210-2 ejects ink corresponding to pixels of a second color (e.g., green G), and the third head pack 210-3 ejects ink corresponding to pixels of a third color (e.g., blue B).

Here, as illustrated in FIG. 4, a last nozzle 212-1B of the first head pack 210-1 and a first nozzle 212-2A of the second head pack 210-2 is configured to overlap each other upon ink deposition. The interval between the head packs 210 is determined according to pixel interval. For other colors, a similar arrangement method may be used. As the nozzles 214 of the head packs 210 are configured to overlap along the first axial direction (Y direction) as illustrated in FIG. 4, the pixel areas on the substrate S and ejection areas coincide with each other, thereby reducing time loss. Here, the number of the nozzles 214 overlapping along the first axial direction (Y direction) may be changed according to the resolution of the substrate S.

However, the inkjet printing equipment 1 described with reference to FIGS. 1 to 4 has the following problems.

Since ink ejected by the nozzle 212-1B and ink ejected by 212-2A are deposited on the substrate S in an overlapping manner, even when ink on the substrate S is photographed for inspection of the nozzles 214, it is impossible to identify from which nozzle 214 the ink is ejected. This results in an increase in inspection time and a decrease in inspection accuracy. For example, when a deposition error is found in ink in a specific row, the use of a plurality of nozzles 214 that may have ejected the ink in the corresponding row is stopped, so that even normal nozzles 214 become unavailable.

In addition, since the inkjet head unit 20 is moved by the two gantries 30 during the movement of the substrate S, a plurality of axial movements occur, resulting in heat. This heat may cause a drive amount error.

In addition, in the case of large-area equipment, the weight of the equipment increases due to its large volume. Also, when performing inkjet printing on the substrate S for each of the printing areas PZ1 and PZ2 of the substrate S, after the process for the specific printing area PZ1 is completed, the process for the next printing area PZ2 proceeds. In this case, switching of the printing areas takes time.

Therefore, in order to solve the above problems of the related art, the present disclosure provides inkjet printing equipment 1 capable of performing an inkjet printing process on a substrate S more quickly and reducing the weight and efficiency of the equipment 1. According to the present disclosure, the head packs 210 are arranged in a line along a single axis (coaxial direction) so as not to overlap along the first axial direction (Y direction), so that the nozzle 214 corresponding to the ink ejected on the substrate S 214 can be easily identified. Hereinafter, an inkjet head unit 20 and the inkjet printing equipment 1 including the same according to the present disclosure will be described.

Figure 5:
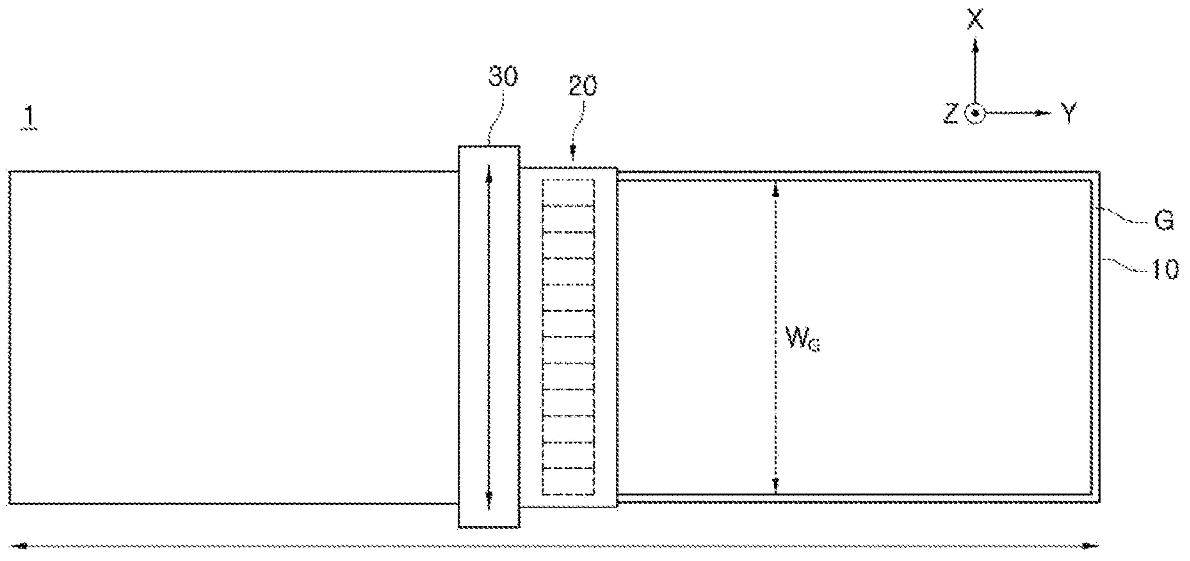
FIG. 5 is a view illustrating the layout of inkjet printing equipment according to the present disclosure.

FIG. 5 is a view illustrating the layout of the inkjet printing equipment 1 according to the present disclosure.

The inkjet printing equipment 1 according to an embodiment of the present disclosure largely includes: a stage 10 for supporting and transporting a substrate S; an inkjet head unit 20 for ejecting ink onto the substrate S; and a gantry 30 for providing a path for movement of the inkjet head unit 20. The inkjet head unit 20 includes: a head pack 210 having a plurality of ejection heads 212 for ejecting ink of the same color onto the substrate S; a head base 220 on which a plurality of head packs 210 are installed to be repeatedly coaxially arranged in color order; a head frame 230 for accommodating the head packs 210 and configured to be moved along the gantry 30.

The stage 10 provides a space in which the substrate S is placed, and may be configured such that the substrate S is moved along the first axial direction (Y direction). For example, in a state in which the substrate S is raised by blowing air from the bottom of the stage 10, grippers (not illustrated) provided on opposite sides of the stage 10 may be moved along the first axial direction (Y direction) while holding the substrate S. Alternatively, the stage 10 may be composed of a plurality of rollers to physically support the substrate S.

The inkjet head unit 20 is a mechanism for ejecting the ink onto the substrate S. A detailed configuration of the inkjet head unit 20 will be described later with reference to FIGS. 6 to 9.

The gantry 30 is provided above the stage 10 and is a structure for installing and moving the inkjet head unit 20. In the gantry 30, a path may be formed so that the head frame 230 of the inkjet head unit 20 is coupled and moved. The gantry 30 may extend along the second axial direction (X direction). According to the present disclosure, the gantry 30 may be provided as a single structure.

In addition, according to the present disclosure, an ink inspection camera 40 for inspecting the state of the ink ejected on the substrate S may be provided. In other words, an inkjet printing equipment 1 according to another embodiment of the present disclosure includes: a stage 10 for supporting a substrate S configured to be moved along the first axial direction (Y direction); an inkjet head unit 20 for ejecting ink onto the substrate S; a gantry 30 for providing a path for movement of the inkjet head unit 20; and the ink inspection camera 40 for inspecting the state of the ink ejected on the substrate S. The inkjet head unit 20 includes: a head pack 210 having a plurality of ejection heads 212 for ejecting ink of the same color onto the substrate S; a head base 220 on which a plurality of head packs 210 are installed to be repeatedly coaxially arranged in color order; a head frame 230 for accommodating the head packs 210 and configured to be moved along the gantry 30.

Figure 6:
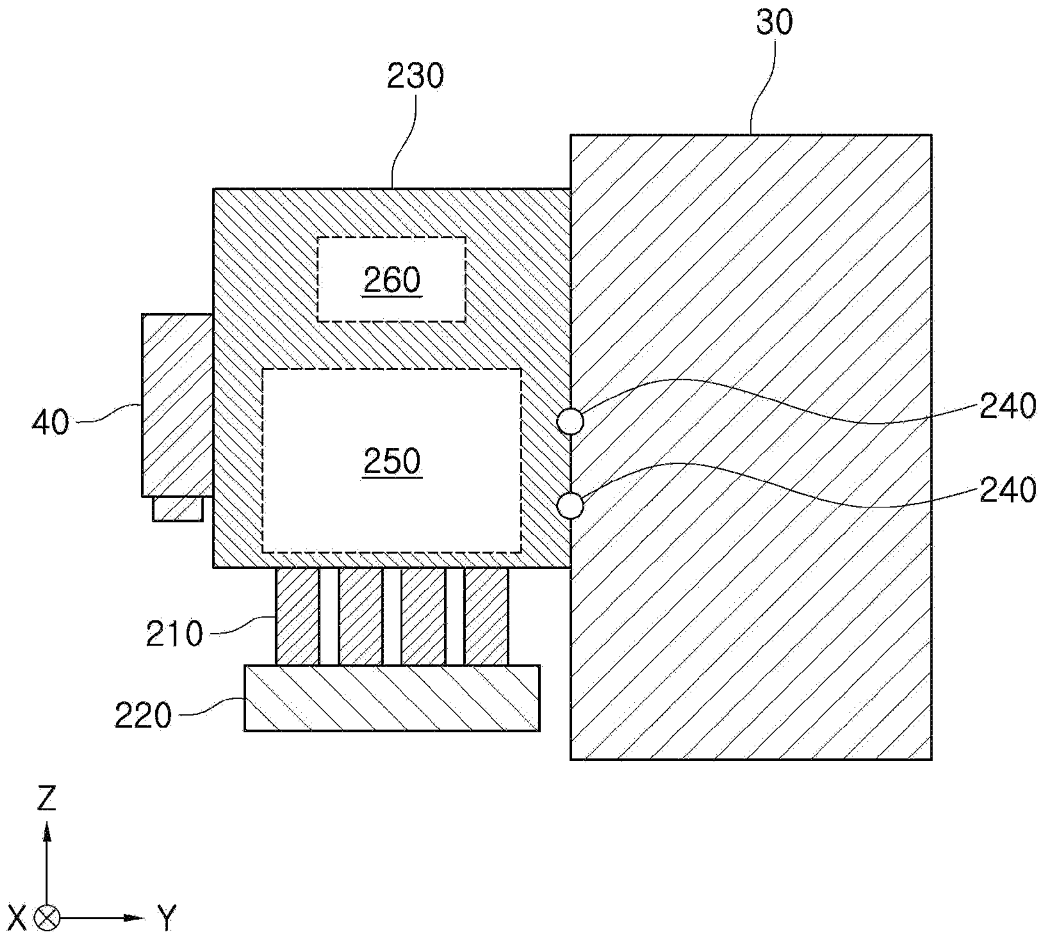
FIGS. 6 and 7 are views illustrating an inkjet head unit in the inkjet printing equipment according to the present disclosure when viewed from the side and from the front.
Figure 7:
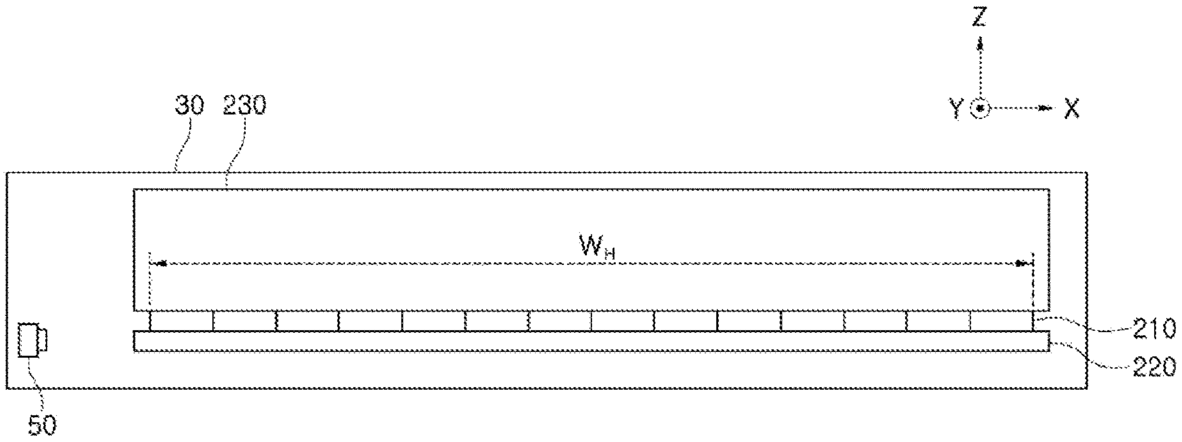

FIGS. 6 and 7 are views illustrating the inkjet head unit 20 in the inkjet printing equipment 1 according to the present disclosure when viewed from the side and from the front. FIG. 6 illustrates the inkjet head unit 20 viewed from the second axial direction (X direction), and FIG. 7 illustrates the inkjet head unit 20 viewed from the first axial direction (Y direction).

Referring to FIG. 6, the head frame 230 is installed on the gantry 30, the head packs 210 each being composed of the plurality of ejection heads 212 are provided under the head frame 230, and the head base 220 supports the bottom of the head packs 210. The head base 220 is installed below the head frame 230. The head base 220 supports the bottom of the head packs 210, and has an opening formed at a portion where each nozzle 214 of the ejection heads 212 is located so that the ink falls onto the substrate S through the opening. In an embodiment, the head base 220 may include or may be formed of a rigid material such as plastic, and may include a body of a cuboid and a plurality of openings that penetrate the body. Each opening may be vertically aligned with a corresponding nozzle 214.

According to the present disclosure, the head packs 210 provided on the head base 220 are coaxially arranged in a line without overlapping along the first axial direction (Y direction). However, within each of the head packs 210, the ejection heads 212 or nozzles 214 may be arranged in an overlapping manner according to pixel resolution. Each of the head packs 210 includes the plurality of ejection heads 212 that eject ink corresponding to pixels of the same color. Each of the ejection heads 212 may include a plurality of nozzles 214. The interval between the head packs 210, the interval between the ejection heads 212 within the head packs 210, and the interval between the nozzles 214 within the ejection heads 212 may be determined according to the area and resolution of the substrate S.

Figure 8:
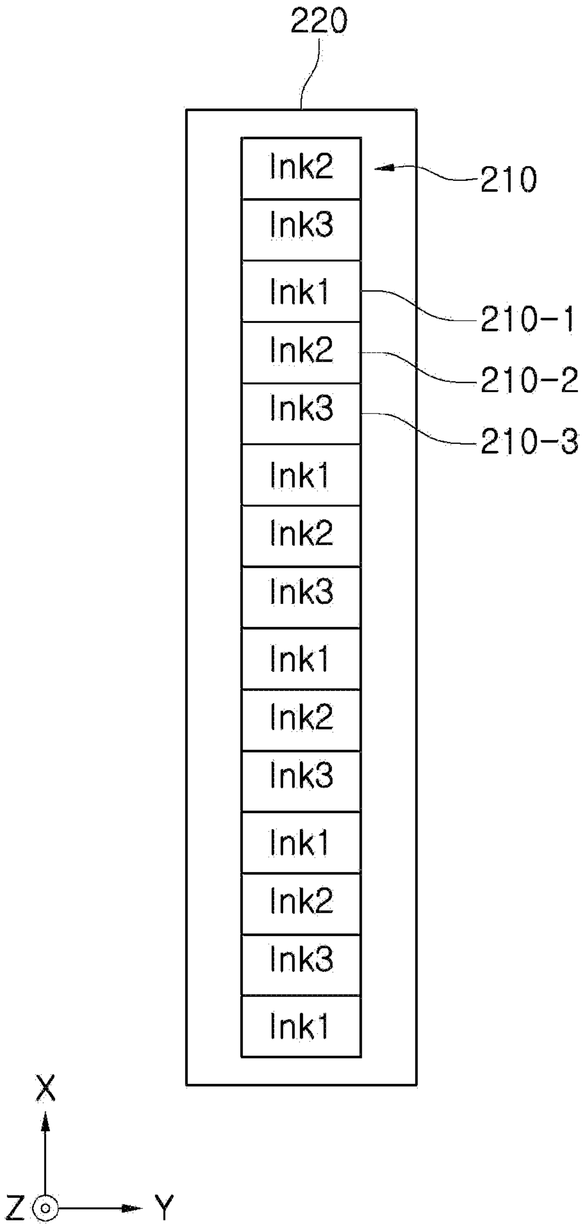
FIG. 8 is a view illustrating the arrangement of head packs in the inkjet head unit according to the present disclosure.

Referring to FIG. 8, the head packs 210 are arranged along the second axial direction (X direction). In this case, the order of arrangement of the head packs 210 is such that color patterns are repeated. For example, the head packs 210 may be arranged such that the order of red R-green G-blue B is repeated.

According to an embodiment of the present disclosure, the head packs 210 may include a first head pack 210-1 having a plurality of ejection heads 212 for eject ink corresponding to a first color (e.g., red R), a second head pack 210-2 having a plurality of ejection heads 212 for ejecting ink corresponding to a second color (e.g., green G), and a third head pack 210-3 having a plurality of ejection heads 212 ejecting ink corresponding to a third color (e.g., blue B).

According to an embodiment of the present disclosure, a head pack set in which the first head pack 210-1, the second head pack 210-2, and the third head pack 210-3 are sequentially arranged may be repeatedly installed on the head base 220.

According to the present disclosure, there exists no pixel in which a plurality of head packs 210 ejects ink in an overlapping manner, and ink ejection for one pixel is performed by corresponding one head pack 210. Thus, when an ink ejection state of a specific pixel is abnormal, a nozzle 214 and a head pack 210 that have ejected ink of the corresponding pixel can be immediately identified, thereby enabling quick and simple nozzle inspection and maintenance.

In other words, due to such a reduction in time for nozzle inspection and maintenance, utilization of the nozzles 214 can be increased, and yield and lifespan can be increased. In addition, inkjet printing is performed on the entire area of the substrate S, and the substrate S does not need to be divided into a plurality of printing areas. Thus, an axial movement amount can be reduced. Also, the overall weight of the equipment 1 can be reduced.

According to an embodiment of the present disclosure, the substrate S is configured to be moved along the first axial direction (Y direction), and the plurality of head packs 210 are arranged along the second axial direction (X direction) orthogonal to the first axial direction (Y direction).

According to an embodiment of the present disclosure, the head base 220 may be configured to be moved along the second axial direction (X direction).

According to an embodiment of the present disclosure, the head packs 210 may be arranged on the head base 220 to have a length wH equal to a length wG of the substrate S in the second axial direction (X direction).

According to the embodiment of the present disclosure, the nozzles 214 of the ejection heads 212 of each of the head packs 210 may be arranged to overlap each other along the first axial direction (Y direction), and each of the head packs 210 and another head pack 210 are arranged so as to not overlap each other along the first axial direction (Y direction).

Figure 9A:
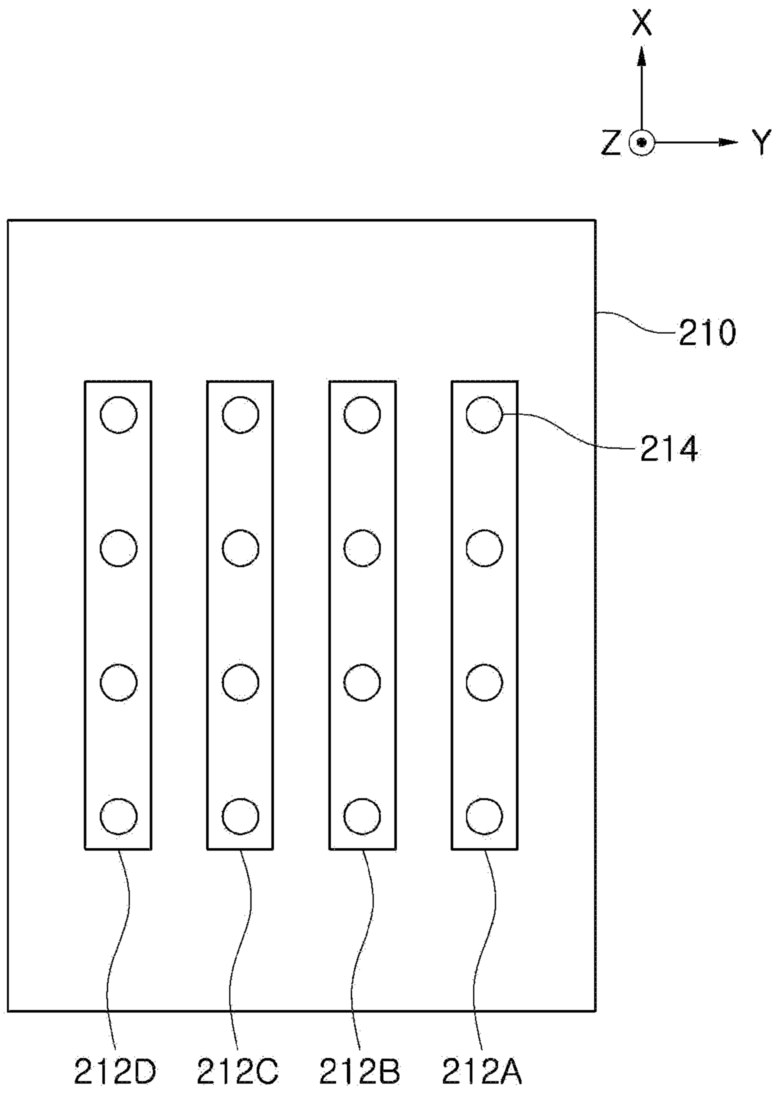
FIGS. 9A and 9B are views each illustrating an example of a head pack according to the present disclosure.
Figure 9B:
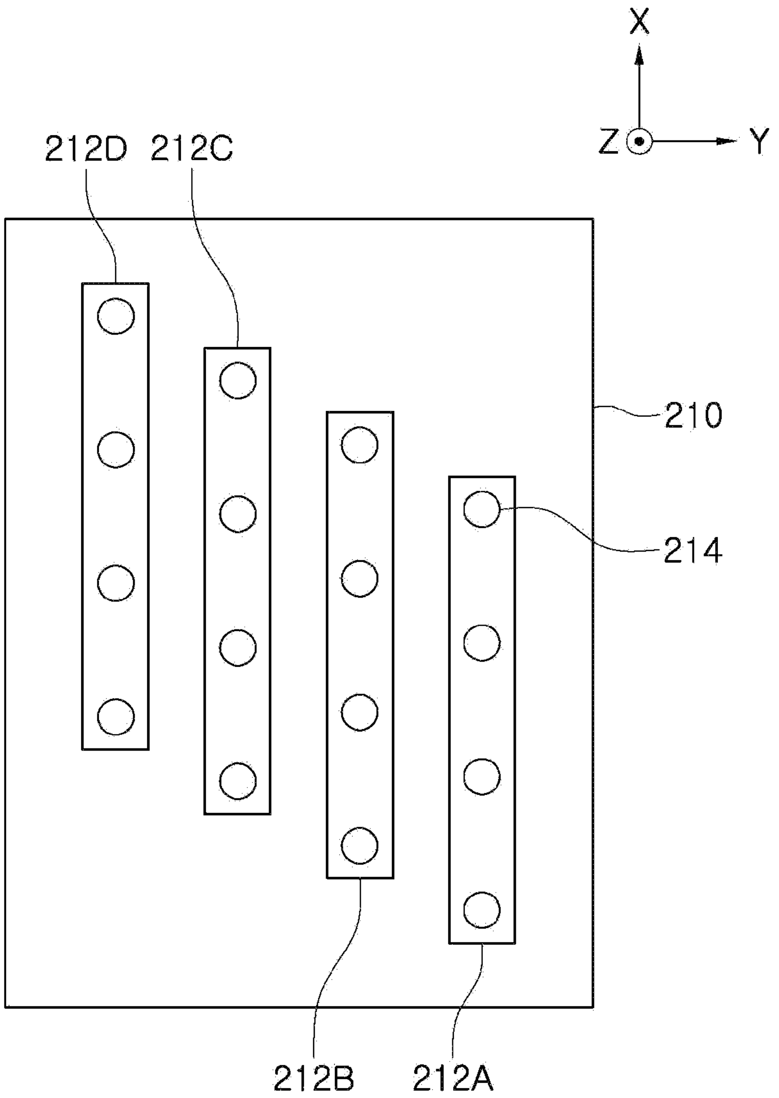

Referring to FIG. 9A, in an example of a head pack 210, a plurality of ejection heads 212A, 212B, 212C, and 212D may be arranged along the first axial direction (Y direction). On the other hand, as illustrated in FIG. 9B, in another example of a head pack 210, a plurality of ejection heads 212A, 212B, 212C, and 212D may be arranged diagonally, and parts of a plurality of nozzles 214 may be arranged to overlap each other along the first axial direction (Y direction).

Meanwhile, referring back to FIG. 6, the ink inspection camera 40 for photographing the ink ejected on the substrate S and inspecting an ejection state of the ink is installed on the outside of the head frame 230. During nozzle inspection and maintenance, the ink inspection camera 40 photographs the ink ejected on the substrate S and provides a resulting image to an external control device (not illustrated). When there exists ink in an abnormal ejection state, the ink inspection camera 40 outputs nozzle information of the head pack 210 that has ejected the corresponding ink.

In addition, the inkjet head unit 20 may further include an ink reservoir 250 for storing ink supplied to the head packs 210 and a pressure controller 260 for controlling ink ejection pressure. The ink reservoir 250 is located above the head packs 210. The ink reservoir 250 is configured to store ink and circulate the ink to the ejection heads 212 of the head packs 210. The pressure controller 260 controls the ink ejection pressure by adjusting the meniscus of the ejection heads 212. The pressure controller 260 is located above the ink reservoir 250. In addition, the inkjet head unit 20 may further include a temperature control mechanism 240 for controlling the temperature of ink and provided between the inkjet head unit 20 and the gantry 30. The temperature control mechanism 240 adjusts the viscosity of ink by adjusting the temperature of the ink stored in the ink reservoir 250. The temperature control mechanism 240 may be configured as a pipe through which a fluid flows at a desired temperature.

In addition, the inkjet printing equipment 1 may further include a flatness inspector (including a camera and a measurement sensor) 50 for inspecting an alignment state of the ejection heads 212. Referring to FIG. 7, the flatness inspector 50 for inspecting the alignment state of the ejection heads 212 is provided on one side of the inkjet head unit 20. However, the position of the flatness inspector 50 is not limited thereto. For example, the flatness inspector 50 may be installed on the gantry 30 or the head frame 230.

While exemplary embodiments of the present disclosure have been described, those skilled in the art will appreciate that various modifications, additions, and substitutions are possible, without departing from the scope and spirit of the present disclosure.

The scope of the present disclosure should be defined only by the accompanying claims, and all technical ideas within the scope of equivalents should be construed as falling within the scope of the present disclosure.

What is claimed is:

1. An inkjet head unit of inkjet printing equipment, the inkjet head unit comprising:

a head base; and a plurality of first head packs ejecting a first color ink, a plurality of second head packs ejecting a second color ink, and a plurality of third head packs ejecting a third color ink, wherein each first head pack of the plurality of first head packs, each second head pack of the plurality of second head packs, and each third head pack of the plurality of third head packs are coaxially and sequentially arranged in a color order and arranged along a single straight line on the head base, wherein each first head pack of the plurality of first head packs includes a plurality of ejection heads configured to eject the first color ink to a substrate, wherein each second head pack of the plurality of second head packs includes a plurality of ejection heads configured to eject the second color ink to the substrate, and wherein each third head pack of the plurality of third head packs includes a plurality of ejection heads configured to eject the third color ink to the substrate, wherein the substrate is configured to be moved along a first axial direction, wherein the single straight line extends in a second axial direction orthogonal to the first axial direction, and wherein the plurality of first head packs, the plurality of second head packs, and the plurality of third head packs are arranged on the head base to have a length equal to a length of the substrate in the second axial direction.

2. The inkjet head unit of claim 1, wherein the head base is configured to be moved along the second axial direction.

3. The inkjet head unit of claim 1, wherein each ejection head of the plurality of ejection heads of each head pack of the plurality of first to third head packs comprises a plurality of nozzles arranged to overlap each other along the first axial direction, and wherein each first head pack of the plurality of first head packs, each second head pack of the plurality of second head packs, and each third head pack of the plurality of third head packs that are arranged along the single straight line extending in the second axial direction do not overlap each other in the first axial direction.

4. An inkjet printing equipment comprising:

a stage configured to support a substrate;

an inkjet head unit configured to eject ink onto the substrate; and a gantry provided as a structure on which the inkjet head unit is installed, wherein the inkjet head unit comprises:

a head base;

a plurality of first head packs ejecting a first color ink, a plurality of second head packs ejecting a second color ink, and a plurality of third head packs ejecting a third color ink, wherein each first head pack of the plurality of first head packs, each second head pack of the plurality of second head packs, and each third head pack of the plurality of third head packs are coaxially and sequentially arranged in a color order and arranged along a single straight line on the head base, wherein each first head pack of the plurality of first head packs includes a plurality of ejection heads configured to eject the first color ink to a substrate, wherein each second head pack of the plurality of second head packs includes a plurality of ejection heads configured to eject the second color ink to the substrate, and wherein each third head pack of the plurality of third head packs includes a plurality of ejection heads configured to eject the third color ink to the substrate; and a head frame on which the plurality of first head packs, the plurality of second head packs, and the plurality of third head packs are installed, and are coupled to the gantry, wherein the substrate is configured to be moved along a first axial direction, wherein the single straight line extends in a second axial direction orthogonal to the first axial direction, and wherein the plurality of first head packs, the plurality of second head packs, and the plurality of third head packs are arranged on the head base to have a length equal to a length of the substrate in the second axial direction.

5. The inkjet printing equipment of claim 4, wherein the head base is configured to be moved along the second axial direction.

6. The inkjet printing equipment of claim 4, wherein each ejection head of the plurality of ejection heads of each head pack of the plurality of first to third head packs comprises a plurality of nozzles arranged to overlap each other along the first axial direction, and wherein each first head pack of the plurality of first head packs, each second head pack of the plurality of second head packs, and each third head pack of the plurality of third head packs that are arranged along the single straight line extending in the second axial direction do not overlap each other in the first axial direction.

7. An inkjet printing equipment comprising:

a stage configured to support a substrate configured to be moved along a first axial direction;

an inkjet head unit configured to eject ink onto the substrate;

a gantry provided as a structure on which the inkjet head unit is installed; and an ink inspection camera configured to inspect a state of the ink ejected on the substrate, wherein the inkjet head unit comprises:

a head base;

a plurality of first head packs ejecting a first color ink, a plurality of second head packs ejecting a second color ink, and a plurality of third head packs ejecting a third color ink, wherein each first head pack of the plurality of first head packs, each second head pack of the plurality of second head packs, and each third head pack of the plurality of third head packs are coaxially and sequentially arranged in a color order and arranged along a single straight line on the head base, wherein the single straight line extends in a second axial direction orthogonal to the first axial direction, wherein each first head pack of the plurality of first head packs includes a plurality of ejection heads configured to eject the first color ink to the substrate, wherein each second head pack of the plurality of second head packs includes a plurality of ejection heads configured to eject the second color ink to the substrate, and wherein each third head pack of the plurality of third head packs includes a plurality of ejection heads configured to eject the third color ink to the substrate; and a head frame on which the plurality of first head packs, the plurality of second head packs, and the plurality of third head packs are installed, and are coupled to the gantry, wherein the substrate is configured to be moved along a first axial direction, wherein the single straight line extends in a second axial direction orthogonal to the first axial direction, and wherein the plurality of first head packs, the plurality of second head packs, and the plurality of third head packs are arranged on the head base to have a length equal to a length of the substrate in the second axial direction.

8. The inkjet printing equipment of claim 7, wherein each ejection head of the plurality of ejection heads of each head pack of the plurality of first to third head packs comprises a plurality of nozzles arranged to overlap each other along the first axial direction, and wherein each first head pack of the plurality of first head packs, each second head pack of the plurality of second head packs, and each third head pack of the plurality of third head packs that are arranged along the single straight line extending in the second axial direction do not overlap each other in the first axial direction.

9. The inkjet printing equipment of claim 7, wherein the inkjet head unit further comprises:

an ink reservoir configured to store the first color ink supplied to the plurality of first head packs, the second color ink supplied to the plurality of second head packs, and the third color ink supplied to the plurality of third head packs; and a pressure controller configured to control an ejection pressure of each of the first color ink, the second color ink, and the third color ink.

10. The inkjet printing equipment of claim 7, further comprising:

a flatness inspection camera installed on the head frame and configured to inspect an alignment state of the plurality of ejection heads in each head pack of the plurality of first to third head packs.

* * * * *